United States Patent Office 3,061,974
Patented Nov. 6, 1962

3,061,974
METHOD FOR GROWING CROPS IN SEMI-ARID REGIONS
Robert A. Louis, Fanwood, and Irven F. Wagner, Plainfield, N.J., assignors to Esso Research and Engineering Company, a corporation of Delaware
No Drawing. Filed Nov. 19, 1959, Ser. No. 854,004
7 Claims. (Cl. 47—9)

This invention relates to establishing and sustaining agricultural crops in semi-arid areas by new and improved methods for conserving and utilizing available moisture.

In particular this invention relates to petroleum based coatings and to their use in new and improved methods for establishing and sustaining grass and other crops on land which receives an insufficient amount of natural rainfall to provide sufficient moisture in the soil for seed germination and to sustain the growth of such crops during the critical seedling stage without irrigation.

More particularly this invention relates to improved methods for the application and field placement of asphalt comprising mulches over seed beds so as to entrap and conserve moisture under such beds thereby permitting the establishment of vigorous grass crops in areas receiving an average rainfall of between about 6 and 30, particularly between 6 and 18, inches per year.

Millions of acres of potentially valuable grazing lands in the western half of the United States along with areas even more vast in other countries normally do not receive sufficient rainfall to reseed and establish grass crops suitable to maintain livestock within economically feasible geographical limits. Imprudent management in marginal cropping areas and overgrazing of poorly established grasslands followed by wind erosion has only served to accentuate the problem. Attempts to seed or reseed these semi-arid lands with suitable range grasses have resulted in the expenditure of large sums in labor and material. Even so, the seeding techniques employed in the past have been only about 10 to 30% successful in the moisture limited areas.

It has now been discovered that the moisture necessary for both seed germination and early plant growth can be maintained in the seed bed by applying certain asphalt emulsions over such seed beds according to the methods hereinafter set forth in detail.

In the past it has been suggested to use various mulches including bitumen between rows of growing plants. However valuable this technique may be in areas of abundant rainfall for keeping down weeds, reducing decay on low hanging fruit and conserving moisture directly below the mulch, this technique cannot provide and maintain sufficient moisture to seed beds in areas of low rainfall. Contrary to theories once held it has been found that protection from evaporation losses is most needed directly above the seed bed. In addition to overhead protection a coating technique must be employed which will allow for replenishment of moisture expended in plant growth when rainfall is available. It has now been discovered that both of these requirements can be met by employing a continuous, moisture impentrable, film of an asphalt comprising emulsion controlled in width over a moisture containing seed bed while leaving an area between seed rows open to receive normal rainfall. A major loss of moisture from a seed bed during the summer growing season results from surface evaporation. In areas of infrequent rainfall the top soil often is depleted of moisture before adequate germination can be affected. In other cases where germination is successfully effected moisture depletion below a sustaining level for young plants subsequently chokes off the incipient growth. According to this invention the emulsion is applied after seeding and preferably when the moisture content of the seed bed is at or near field capacity. Field capacity is defined as the amount of water held in the soil after excess water has drained away via gravitational force and after the rate of downward movement of water has materially decreased. The asphalt strip covering the seed bed then tends to function in a manner similar to a "one way valve." When a rainfall occurs which is sufficient to temporarily saturate the top layer of soil the lateral movement of moisture is relatively rapid, i.e. at a rate of several inches per hour with some variance which is dependent upon the type of soil. When rainfall ceases and the field drains or is otherwise depleted of moisture to the level of field capacity or below, the rate of lateral migration drops off sharply until such movement is negligible and for all practical purposes may be considered as nonexistent. During the short periods of surface saturation rainfall on the uncoated areas will move under the coated strips to replenish the moisture of the seed bed. When the saturated condition in the uncoated areas ceases to exist the moisture which has moved beneath the coated strips is trapped and will not be lost to any appreciable extent either by lateral movement or surface evaporation. Thus, by this technique the moisture obtained from infrequent and short periods of rainfall can be trapped and conserved at the very point where it is needed most so as to afford a luxuriant plant growth where uncoated seed beds are unable to sustain any desirable plant life. It is accordingly a part of this invention that the asphalt comprising strips be limited in width to afford the protection hereinbefore discussed. It is thus necessary that the width of such strips be sufficiently wide to afford protection from surface evaporation from an area directly above and within close proximity of the seed or plant roots. At the same time to take advantage of subsequent rainfalls the strip must be sufficiently narrow to permit the lateral migration of water during short periods of surface saturation to reach all of the area immediately below the coating. This will to some extent be dependent upon the amount of rainfall during the growing season, the frequency of rainfall during the growing season and the type of soil upon which the application is made. However, this method can be satisfactorily employed using strips over the seed rows having a width in the range of 2 to 15, preferably 3 to 10, inches. Range grasses as well as other crops in semi-arid regions are preferably established as row crops with such rows spaced apart a distance in the range of about 7–42 inches, preferably 12–36 inches, to conserve moisture. The stripping technique of this invention provides the maximum of moisture protection with a minimum of coating material. The film over the seed row should be a continuous one, essentially impenetrable to water or water vapor and of a thickness and consistency suitable for penetration by young plants or seedlings. The asphalt emulsion may be applied by any method suitable for leaving a thin continuous film over the seed bed. The preferred method for effecting this application is by spraying, employing either conventional pressure or air atomization techniques.

Asphalt emulsions which are suitable for use with this invention may be either acidic (cationic) or basic (anionic) although the acidic emulsions are preferred. Both are asphalt in water emulsions. Typical specifications for both types are listed in the following table.

TABLE I

*Characteristics and Composition of Acidic and Basic Emulsions*

|  | Basic | Acidic |
|---|---|---|
| Emulsion characteristics: | | |
| Viscosity, Saybolt Fural @ 77° F | 20–200 | 20–200 |
| Residue (by distillation) Wt. Percent | 57–70 | 57–70 |
| Settlement, 5 days, Wt. Percent | 0–3 | 0–3 |
| Residue characteristics: | | |
| Penetration @ 77° F., 100 g.; 5 sec | 85–200 | 10–200 |
| Solubility in CS₂, Percent | 97+ | 97+ |
| Ductility @ 77° F., cm | 40+ | 40+ |
| Softening Point, °F | 100–125 | 100–175 |
| Composition, Wt. Percent: | | |
| Water | 30–43 | 30–43 |
| Asphalt | 57–70 | 57–70 |
| Emulsifier (Preferably polyamines for acidic emulsions, fatty acids for basic)— | | |
| NaOH | .6–.8 | |
| HCl (36%) | | 0.1–0.4 |

Suitable emulsifying agents for use in preparing these emulsions include the following.

Cationic agents:
(1) Primary, secondary, tertiary, and polyamine salts such as the diamine dichloride

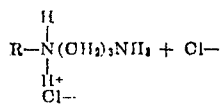

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

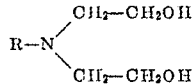

where R is as defined in (1).

(3) Quaternary ammonium salts such as

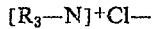

(4) Dimethylated amine salts such as

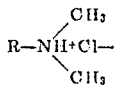

(5) Aromatic amine salts and cyclic amine salts.
(6) 2-imadazoline.

Anionic agents:
Alkali metal salts of fatty acids such as

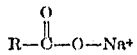

where R is an alkyl chain with 8–22 carbon atoms, preferably 14–18. The potassium salt may also be used. Also, the emulsifying agent is not always one specific compound but could be a mixture of salts of fatty acids in which R varied in length. Examples of these are a sodium salt of pine wood lignin and a salt of a long chain acid resin from the destructive distillation of pine wood stumps; also fine clays such as bentonite can be used.

Whereas, the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid (CH₃COOH) or nitric acid (HNO₃) could be used instead of HCl on a mole per mole basis. Also, KOH could be used instead of NaOH although the latter is cheaper.

Other petroleum products may be used in lieu of asphalt in these emulsions or as non-emulsified liquids providing they are of a suitable viscosity for application by spraying, form a continuous film which is penetrable to young seedlings but essentially impenetrable to water, and do not possess a high degree of herbicidal properties. Suitable petroleum products for this use include crude oils low in sulfur content, petroleum waxes, wax and asphalt mixes, residua, etc.

For the purposes of this invention the emulsions set forth in Table I may, for want of a better term, be referred to as emulsion concentrates. For the purposes of this invention such emulsions are further diluted with 0.8 to 3 parts of water prior to application. For minimizing evaporation losses with soils in general it has been found that optimum results are obtained when about 1.0 to 1.70, preferably about 1.3, volumes of water are employed per equivalent volume of emulsion concentrate. More specifically, maximum effectiveness in retarding evaporation from a silt loam type soil while using a minimum amount of emulsion is obtained by spraying onto the soil an emulsion as characterized in Table I diluted to the extent of 1.18±0.25 to 1.47±0.25 volumes of water per volume of emulsion, such dilution increasing linearly from the low dilution to the higher dilution as the soil density decreases from about 1.60 to 1.20 gm./cm.³. These emulsions may be prepared in the conventional manner as follows:

The emulsifying solution of the desired formulation at a temperature of 120° to 150° F. and the asphalt at a temperature of about 240° F. may be fed in separate streams to a conventional colloid mill. Other conventional techniques for effecting emulsification may be employed if colloid milling is not convenient. The preferred emulsification temperature is about 180°–190° F. A thin continuous film of such emulsions will retard evaporation rates by 90 to 99% as compared to bare soil. Such emulsions (based on undiluted emulsion concentrate) should be applied at a rate in the range of 150 to 1000, preferably 300 to 750 gal. per acre of coverage.

In addition to grass crops, this invention may be used to grow most any type of row crop such as sugar beets, corn, potatoes, sorghums, cotton, soybeans and vegetables of a truck farming operation. It is particularly adapted for use with crops which do not require cultivation during the growing season. Grass crops which may be grown successfully in semi-arid regions by using the technique of this invention include the genera of Andropogon (beardgrass or bluestem), Bouteloua (gramas), Buchloe (dactyloides—buffalo grass), Eragrostis (lovegrasses), Festuca (fescues), Hilaria, Leptochloa (sprangletop), Panicum (virgatum—switchgrass), Poa (bluegrass), Setaria (bristlegrass) and Stipa (needlegrass). The technique is especially valuable in establishing the valuable native grasses, such as blue grama, black grama, side oats grama, buffalo grass, plains bristlegrass and Blackwell switchgrass.

EXAMPLE 1

An asphalt emulsion was prepared in the following manner.

An emulsifying solution was first prepared by mixing the ingredients set forth in the following formulation.

2.6% indulin C [1]
3.6% vinsol [2]
0.75% NaOH
93.1% water

[1] A sodium salt of a pine wood lignin.
[2] Long chain acid resin from the destructive distillation of pine wood stumps.

The emulsifying solution and asphalt having the following characteristics,

Penetration @ 77° F., 100 g.; 5 sec. _____ 143
Softening Point, ° F. _____ 110
Viscosity, SSF @ 275° F. _____ 209
Ductility @ 77° F. _____ 45 were emulsified at about 190° F. by passing a stream of the emulsifying solution at about 140° F. and a stream of such asphalt at about 240° F. through a colloid mill. The emulsion thus prepared was examined and found to have the following characterisics:

Viscosity SSF @ 77° F. _____ 31
Percent residue by distillation _____ 60
Sieve test, (retention on #20 sieve) percent _____ 01—

EXAMPLE 2

An emulsion is prepared as in Example 1 except that the emulsifying agent employed was the potassium salt of a fatty acid having the formula

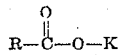

wherein R is an alkyl chain containing 15 carbon atoms.

EXAMPLE 3

The emulsion of Example 1 was applied in a thin continuous film to a silt loam soil having properties as hereinafter set forth to test the moisture retention qualities of such film as compared with bare soil under identical conditions.

Soil analysis (mechanical):

Percent clay _____ 20.
Percent silt _____ 48.
Percent sand _____ 32.
Field bulk density (dry) _____ 1.25 gm./cm.³.
Moisture content at field capacity[1] (wt. percent) _____ 22.
Moisture content at wilt point[2] (wt. percent) _____ 8.

[1] Moisture content after 24-48 hours after heavy rain or soaking.
[2] As related to plants, the soil-moisture content at which soil cannot supply water to the plant at a sufficient rate to maintain turgor, and the plant permanently wilts.

The rate of application of the film used for the test was 290-820 gal. per acre coated based on emulsion concentrate. The rate was dependent on soil density and emulsion dilution. The moisture content of the soil at the beginning of the test was 14.9–18.5 wt. percent (dry basis).

Evaporation conditions:

Temperature _____ 60–90° F.
Relative Humidity _____ 40–75%.

Over a 24-hour period the average loss of moisture from the uncoated control was 0.011 gm./cm.²/hr. The average loss from the coated area during the same period of time was 0.0011 gm./cm.²/hr.

EXAMPLE 4

The experimental test site was an area of abandoned cropland with a sandy loam soil which was in fallow. The surface of the soil was rough. The plots were leveled with a spike-toothed harrow, packed with a cultipacker, and smoothed with a board and chain drag. At this time, the top inch of soil had dried out so that the moisture content was below that available to plants. A regular grass seeding drill, which seeded five rows at one-foot intervals, was used to seed five rows on two plots with blue grama grass, the seeds being planted at a depth of ½–⅝ inch. Blue grama is a perennial grass native to the area.

Prior to spraying any given area with asphalt, the area was rolled with a small smooth roller and sprayed with about 0.06 inch of water. Also, the corresponding control area was sprayed with this water. Three fifty-foot areas on each of the two plots were involved in the test. These areas received 0, 25, and 50% coverage with asphalt. The 25 and 50% coverages consisted of 3 inch and 6 inch strips of asphalt film over the seed row. The fifty-foot areas with 25 and 50% coverage with asphalt were split in half such that one-half was coated with each of two emulsions.

The basic emulsion was equivalent to the emulsion prepared in Example 1. The acid emulsion concentrate had the following composition and properties.

Component:
　Asphalt _____ 60–
　Water _____ 40–
　Amine emulsifier _____ 0.21
　HCl (36%) _____ 0.18
Emulsion residue:
　Viscosity, SSF @ 275° F. _____ 250
　Softening Point, ° F. _____ 121
　Penetration 77° F./100 g./5 sec. _____ 66

The emulsion concentrates were diluted with 1.3 volumes of water per volume of emulsion. These were then sprayed on to four of the five seed rows in their respective areas in amounts of 750 gal. and 500 gal. of emulsion concentrate per acre coated for the acidic and basic emulsions respectively. The pumping and spraying of the emulsion were accomplished with a compressed air-operated pump and a hand-operated, air-atomizing spray gun.

Emergence and growth of grass seedlings was followed with time. Average number of seedlings per foot and average seedling height are given in the following table for inspections at 10 and 45-day intervals after seeding.

TABLE II

*Number of Plants Per Foot of Seeded Row and Average Height of Plants*

50 PERCENT ASPHALT COVERAGE

|  | Acidic Emulsion—10 Days After Seeding | | Acidic Emulsion—45 Days After Seeding | | Basic Emulsion—10 Days After Seeding | | Basic Emulsion—45 Days After Seeding | |
| --- | --- | --- | --- | --- | --- | --- | --- | --- |
|  | No./ft. | Ht. cm. | No./ft. | Ht. cm. | No./ft. | Ht. cm. | No./ft. | Ht. cm. |
| Rep. 1 | 18.10 | 0.60 | 8.40 | 7.45 | 2.85 | 0.50 | 7.60 | 5.15 |
| Rep. 2 | 8.20 | 0.70 | 11.55 | 4.25 | 5.25 | 0.70 | 8.05 | 4.35 |

25 PERCENT ASPHALT COVERAGE

| Rep. 1 | 7.95 | 0.70 | 7.15 | 5.95 | 6.50 | 0.80 | 6.95 | 5.03 |
| Rep. 2 | 8.70 | 0.80 | 7.40 | 6.01 | 3.95 | 0.80 | 4.05 | 3.89 |

0 PERCENT COVERAGE

| Rep. 1 | 0 | 0 | 8.10 | 3.78 |  |  |  |  |
| Rep. 2 | 0 | 0 | 7.80 | 2.85 |  |  |  |  |

Rainfall on the plots was as follows:

| Days after seeding: | Amount |
|---|---|
| 23 | 0.71 |
| 27 | 0.35 |
| 31 | Trace. |

Good emergence of grass seedlings had been obtained on the coated areas 7–8 days after application because of the favorable moisture environment created under the films due to movement of moisture into the seed zone from below and the impenetrability of the films to water and water vapor. Emergence on the checks occurred only after the rains occurring some twenty odd days after seeding. Thus, when the blue grama plants on the coated area were well established, the seedlings on the uncoated areas were struggling to survive.

If desired, varying amounts of fertilizer including nitrogen, phosphorus and potash types may be included in the aqueous phase of the emulsion. Ammonium hydroxide provides a valuable soil nutrient and may be used in lieu of sodium hydroxide in basic emulsions. Incorporation of small amounts of sodium silicate may also be found useful in some embodiments.

What is claimed is:

1. A method for growing crops in a seed bed wherein seeds are planted in rows spaced apart a distance in the range from about 7 to 42" which comprises coating seeded rows with an asphalt-comprising emulsion so as to form a continuous film strip above such rows having a width in the range from about 2 to 15" which is essentially impenetrable to water and penetrable to seedlings, leaving an uncoated area between said rows, said asphalt emulsion consisting essentially of an emulsion concentrate having a viscosity at 77° F. of 20 to 200 S.S.U. containing about 30 to 43 wt. percent water, about 57 to 70 wt. percent asphalt having a softening point in the range from about 100 to 175° F., an emulsifying agent, and diluted with water.

2. Method as defined by claim 1 wherein said emulsion is diluted with from about 0.8 to 3.0 volumes of water per volume of said concentrate.

3. A method in accordance with claim 1 wherein said emulsion has a pH in the range of 2 to 6.7.

4. A method in accordance with claim 1 wherein said emulsion has a pH in the range of 8 to 13.

5. A method in accordance with claim 1 wherein said concentrate contains from 0.035 to 0.2 wt. percent hydrogen chloride.

6. A method in accordance with claim 1 wherein said concentrate contains from 0.1 to 1.0 wt. percent NaOH.

7. A method in accordance with claim 1 wherein said emulsion concentrate is diluted with 0.8 to 1.7 volumes of water per volume of said concentrate.

References Cited in the file of this patent

UNITED STATES PATENTS

| 1,544,990 | Johnson | July 7, 1925 |
| 1,864,672 | Rose | June 28, 1932 |
| 2,087,400 | Fair | July 28, 1937 |
| 2,333,959 | Smith | Nov. 9, 1943 |
| 2,625,529 | Hedrick | Jan. 13, 1953 |
| 2,632,979 | Alexander | Mar. 31, 1953 |
| 2,927,402 | Goren | Mar. 8, 1960 |
| 2,940,920 | Garwin | June 14, 1960 |

FOREIGN PATENTS

| 563,387 | Belgium | Jan. 15, 1958 |

(Corresponding U.S.—Gaeth, 2,945,322, July 19, 1960.)

OTHER REFERENCES

Chepil: "Effects of Asphalt on Some Phases of Soil Structure * * *," published April 1955 in Soil Science Society of American Proceedings, vol. 19, No. 2, pages 125 through 128.